Aug. 16, 1932.  J. H. MACDONALD  1,871,856
TRENCHING MACHINE
Filed Feb. 14, 1930  8 Sheets-Sheet 1
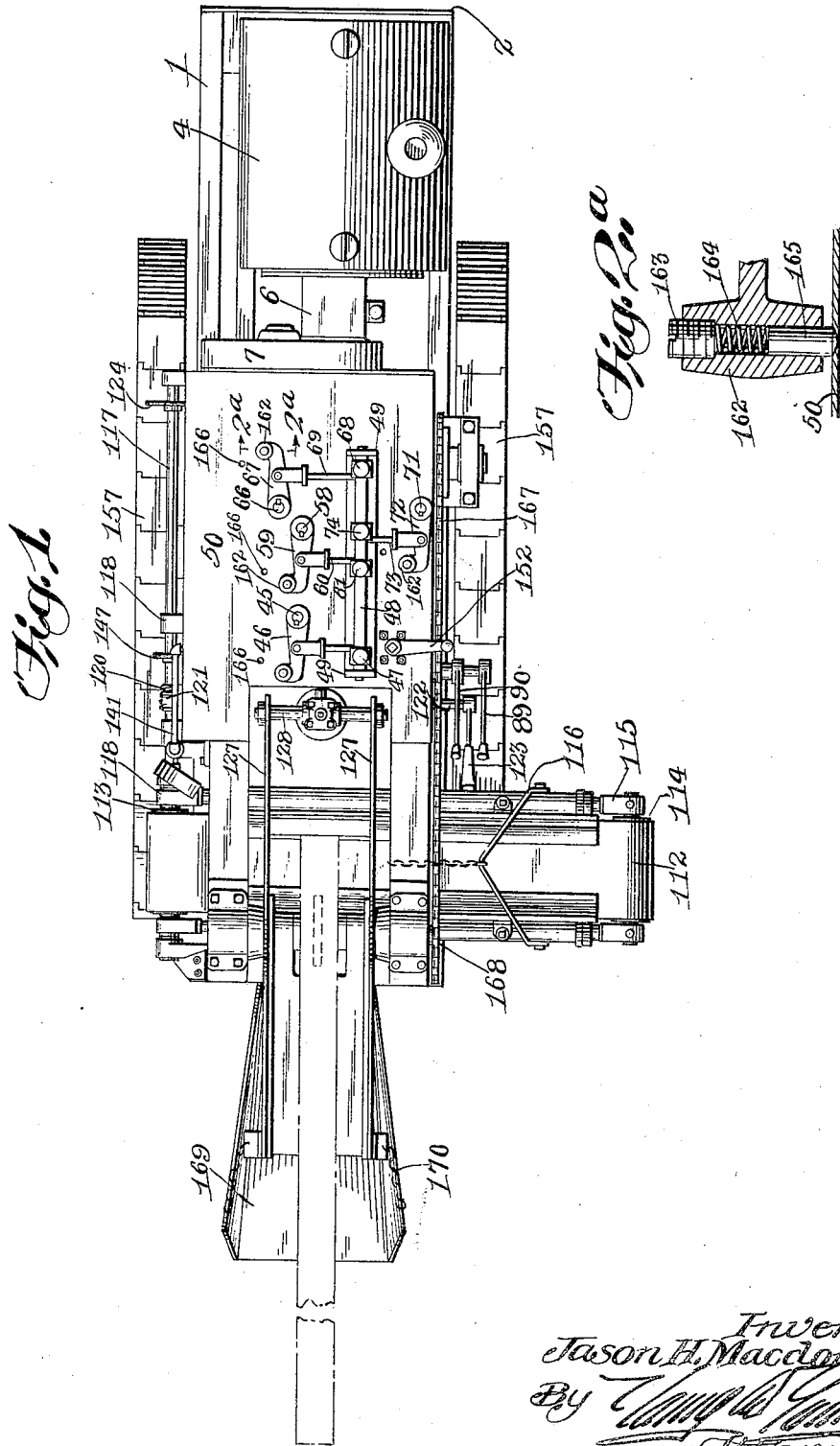

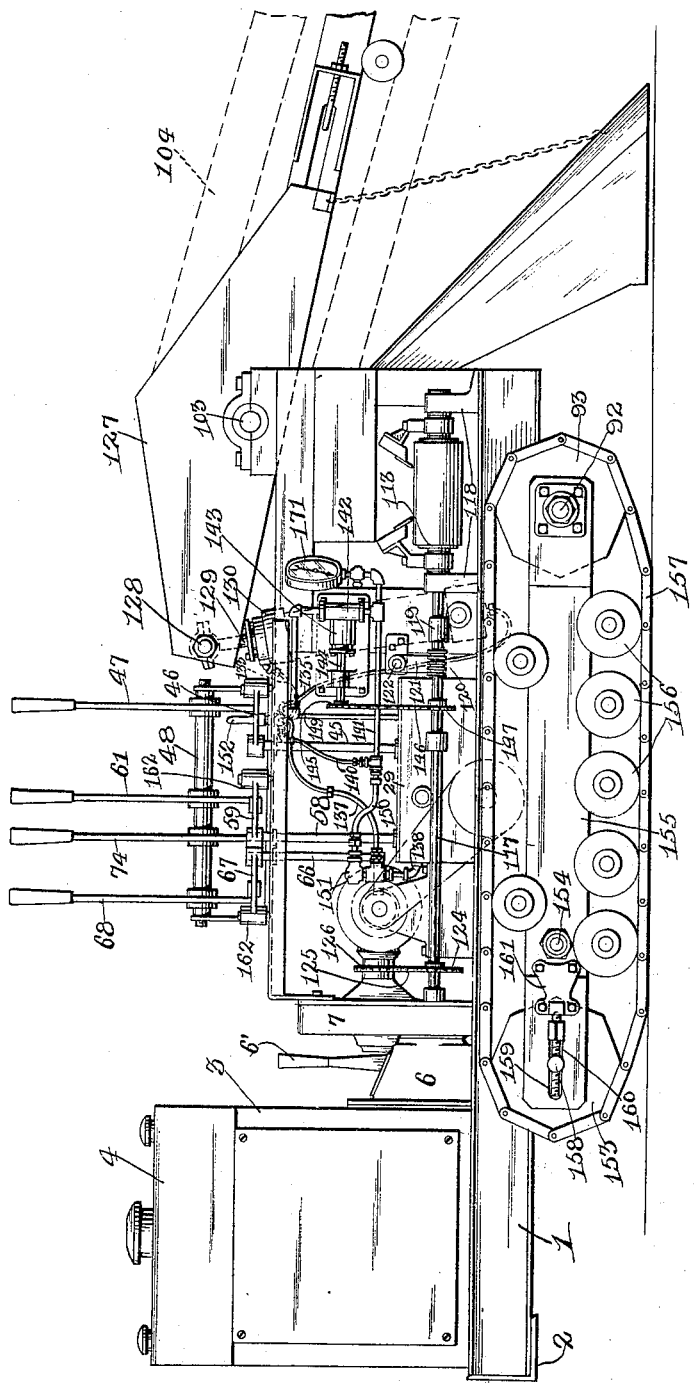

Aug. 16, 1932.    J. H. MACDONALD    1,871,856
TRENCHING MACHINE
Filed Feb. 14, 1930    8 Sheets-Sheet 3
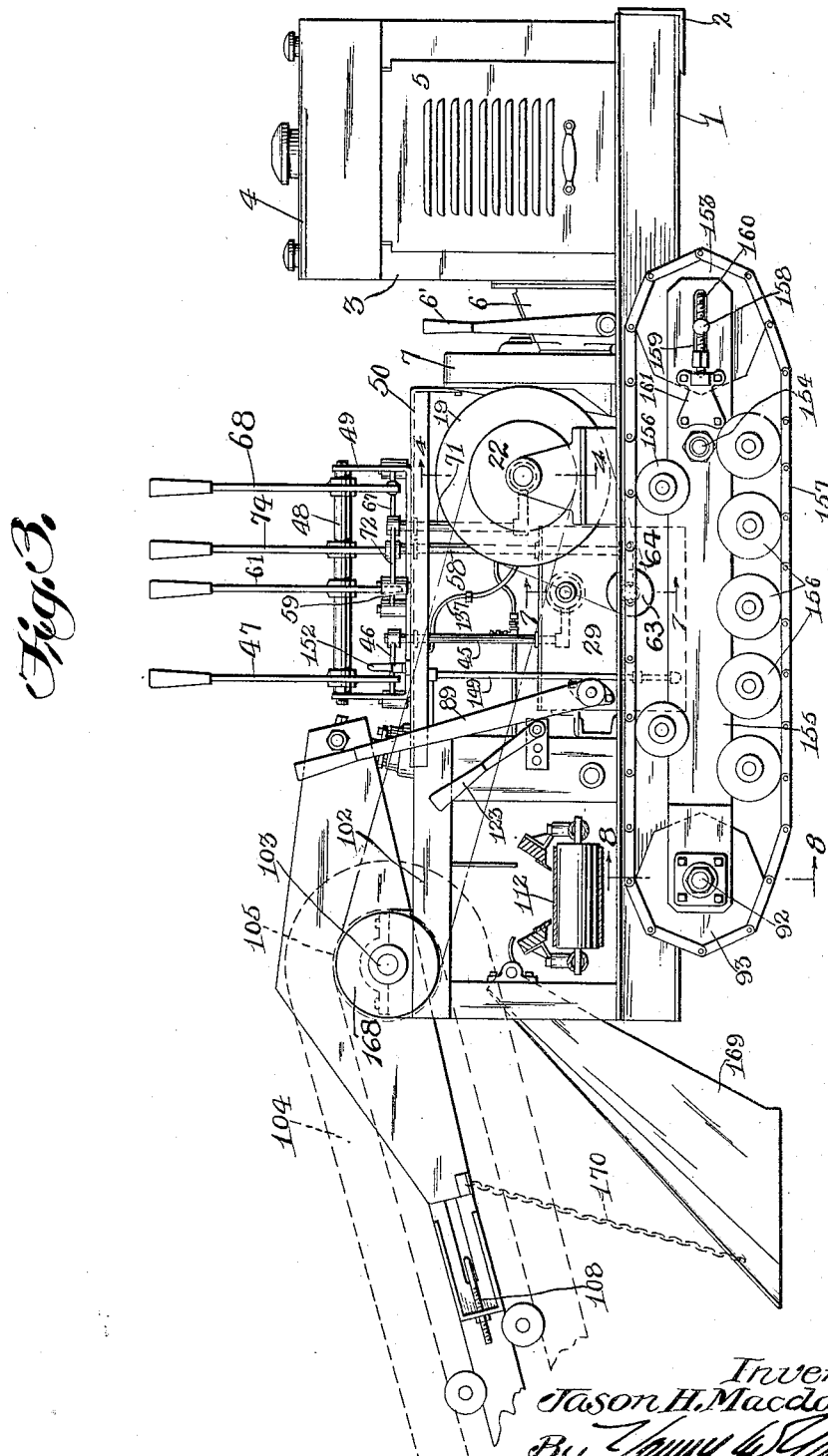

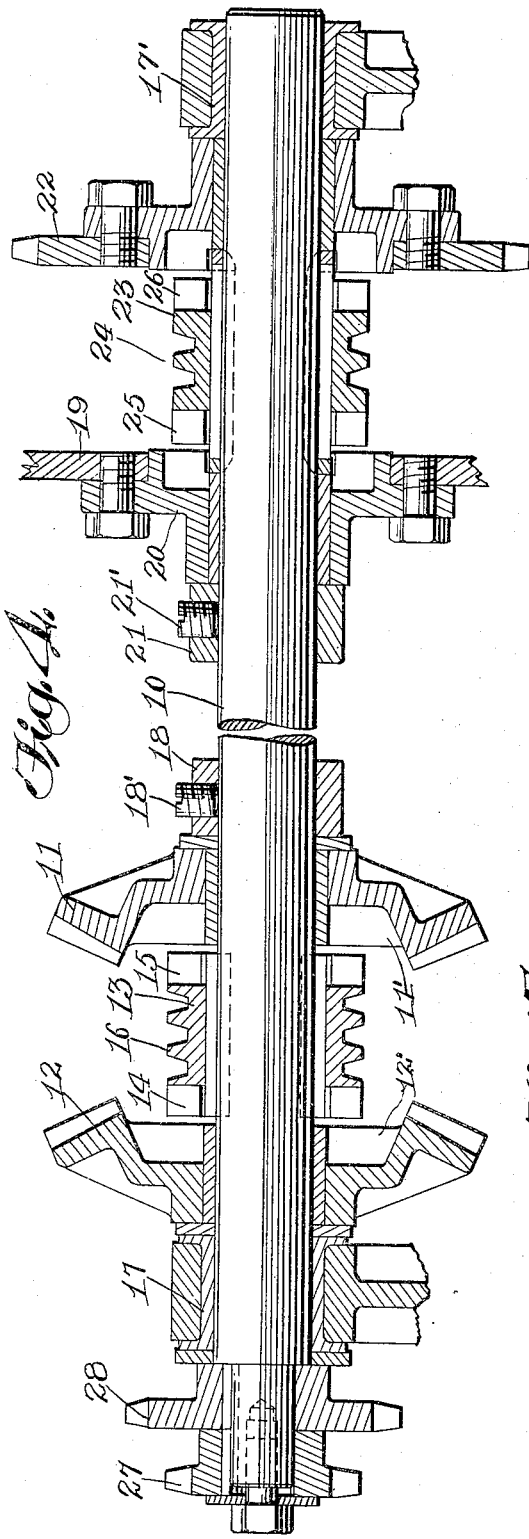
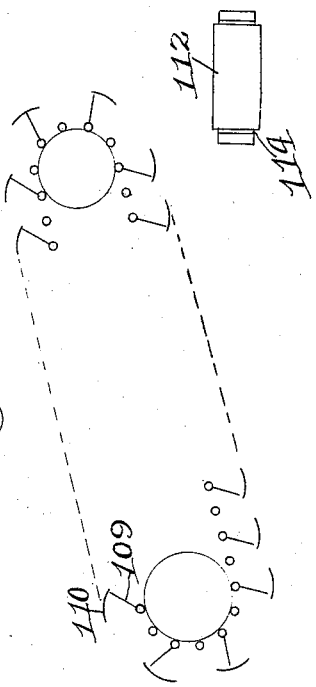
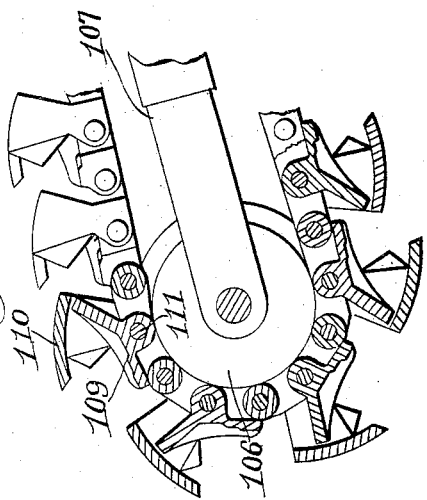

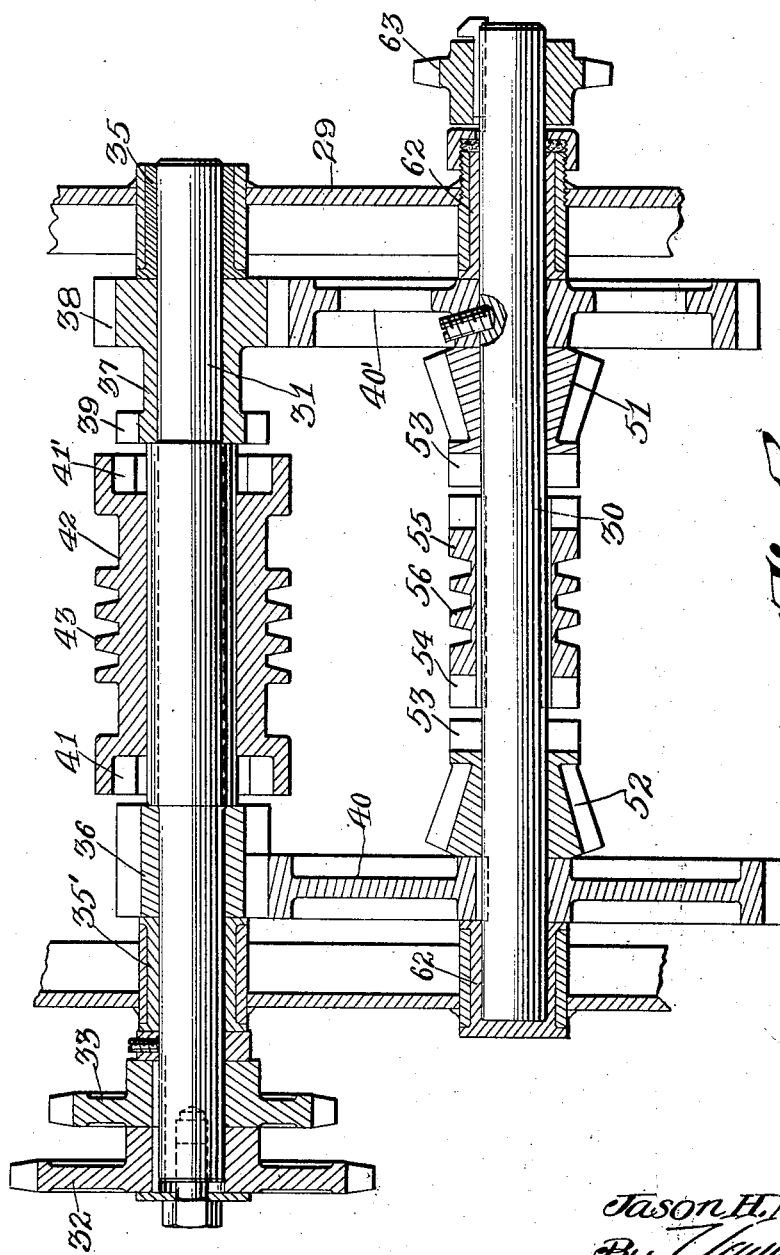

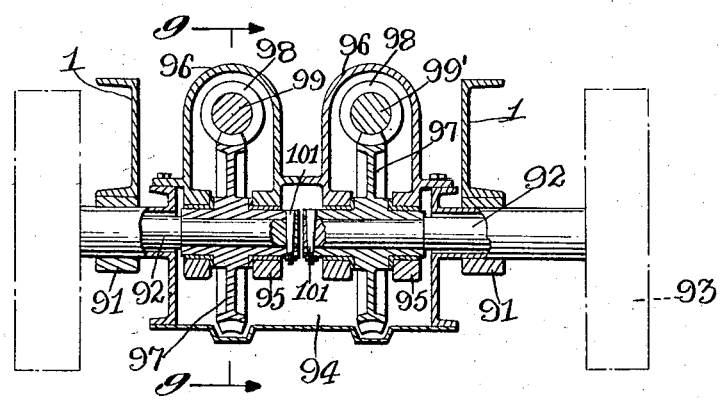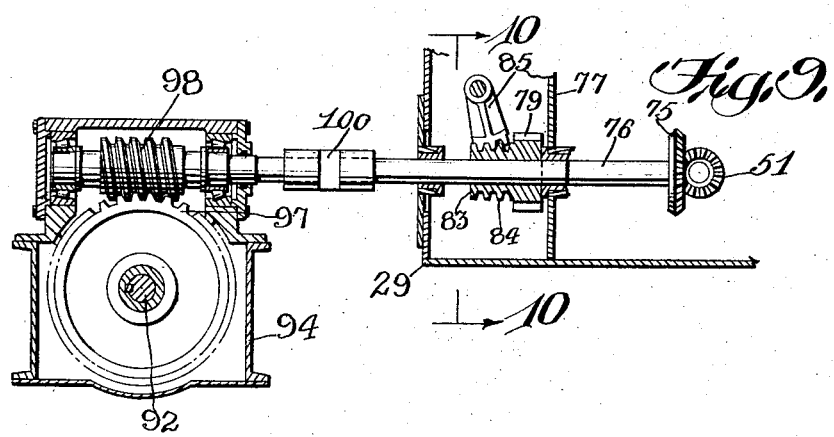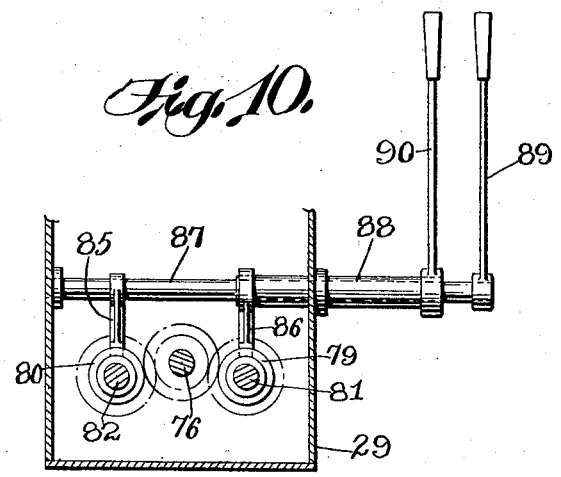

Aug. 16, 1932.  J. H. MACDONALD  1,871,856
TRENCHING MACHINE
Filed Feb. 14, 1930   8 Sheets-Sheet 7

Inventor
Jason H. Macdonald
By
Attorneys

Aug. 16, 1932.  J. H. MACDONALD  1,871,856
TRENCHING MACHINE
Filed Feb. 14, 1930   8 Sheets-Sheet 8

Inventor
Jason H. Macdonald
By
Attorneys

Patented Aug. 16, 1932

1,871,856

UNITED STATES PATENT OFFICE

JASON H. MACDONALD, OF MILWAUKEE, WISCONSIN, ASSIGNOR TO C. H. & E. MANUFACTURING COMPANY, INC., OF MILWAUKEE, WISCONSIN

TRENCHING MACHINE

Application filed February 14, 1930. Serial No. 428,425.

This invention relates to improvements in trenching machines and more particularly to a tractor trenching machine.

One of the objects of my invention is the provision of a trenching machine which is used in connection with a tractor and the driving means for the trenching device is operatively connected to the main driving shaft of the tractor engine in such manner that the trenching device can be quickly connected to the tractor engine for operation, or quickly detached when desired.

Another object of my invention is the provision of a trenching machine which is of the tractor type wherein the device can be readily moved from place to place and the construction includes means whereby the tractor can be driven at different rates of speed so that when the trenching device is not in use, the tractor can be quickly driven from place to place, and when the trenching device is in use, the tractor can be moved at a very low rate of speed so as to move the trenching device along in accordance with its digging operation.

A further object of the invention is the provision of improved hydraulic means for raising and lowering the trenching means with respect to the tractor means, whereby the trenching means can be disposed at various angles with respect to the tractor in accordance with the digging operations so that the trenching and digging means can always be moved into contact with the earth and raised and lowered at the will of the operator.

A still further object of the invention is the provision of novel means for connecting the digging mechanism with the drive shaft of the motor which is carried by the tractor so that the digging means can be readily operated from the motor of the tractor or disconnected therefrom.

A still further object of the invention is the provision of an improved connection between the tractor means and the motor, whereby the tractor may be driven at different rates of speed and reversed at the will of the operator, as well as means for readily tightening the tractor belt when so desired.

A still further object of the invention is the provision of a tractor or trenching machine wherein the operating levers are arranged in a novel manner in close proximity to each other so that the operator can remain in one position and still have all of the operating levers within his reach so that any change in the operation of the machine can be quickly and readily accomplished.

Another object of the invention is the provision of a machine of the above character including novel means for steering, wherein both of the tractor shafts may be driven simultaneously, or one may be driven independently of the other.

With the above and other objects in view, the invention consists in the novel features of construction, the combination and arrangement of parts hereinafter more fully set forth, pointed out in the claims and shown in the accompanying drawings wherein:

Figure 1 is a top plan view of a tractor trenching machine constructed in accordance with my invention;

Figure 2 is a side elevation looking at one side of the machine;

Figure 2A is a detail section on the line 2A—2A of Figure 1;

Figure 3 is a side elevation looking toward the opposite side from that shown in Figure 2, with parts omitted and also parts broken away and shown in cross section;

Figure 4 is a longitudinal section on the line 4—4 of Figure 3;

Figure 5 is a detailed section of the digging element with parts illustrated in elevation;

Figure 6 is a diagrammatic view of the digging elements and the conveyor belt;

Figure 7 is a sectional view on the line 7—7 of Figure 3;

Figure 8 is a section on the line 8—8 of Figure 3;

Figure 9 is a section on the line 9—9 of Figure 8;

Figure 10 is a section on the line 10—10 of Figure 9;

Figure 11:
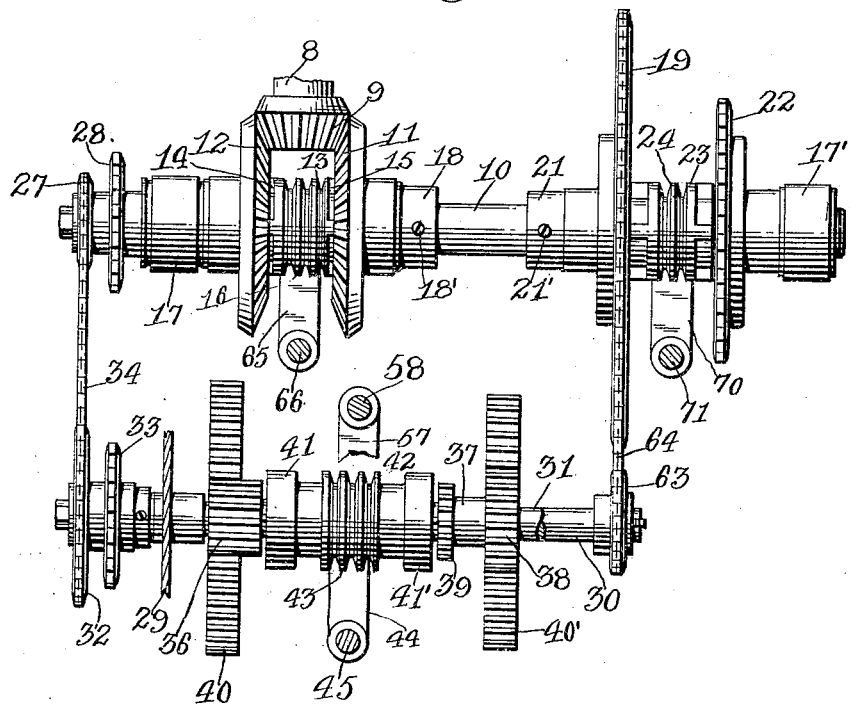
Figure 11 is a plan view illustrating the relative positions of the driving elements; and, Figure 12 is a top plan view of the four-way valve which controls the hydraulic hoist for the trenching or digging elements.
Figure 12:
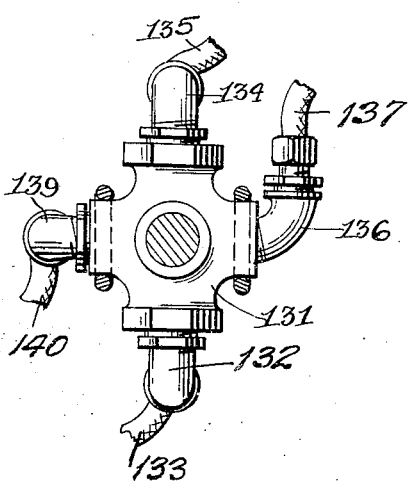
Figure 13:
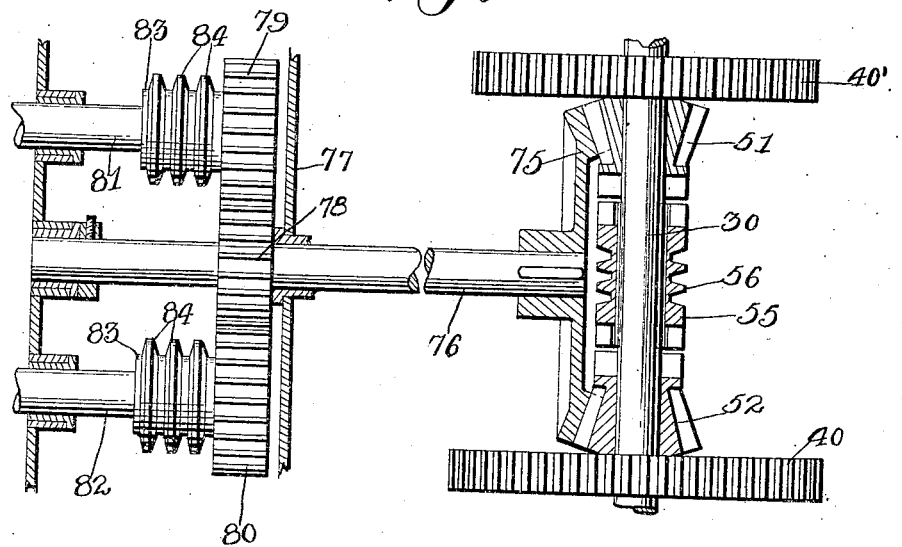
Figure 13 is a detail plan view of the driving and steering connection.

Referring more particularly to the drawings, it will be noted that the operative parts of the machine are mounted upon a suitable frame which includes the parallel channel beams 1 connected at the forward end by the transverse angle beam 2, and they may be further connected by any suitable type of connecting means in order to form a substantially rigid frame for the entire structure.

At the forward end of the frame is the engine housing 3 having a cover 4 and a removable side member 5 whereby access to the engine may be readily obtained. Directly back of the housing 3 is the usual clutch housing 6, and adjacent the clutch housing is a second housing 7 for the reduction gears, and leading from the housing 7 is a drive shaft 8 having a bevelled pinion 9 at its outer end.

Extending transversely of the frame is what is hereinafter to be known as the drive shaft indicated at 10. Loosely mounted upon the drive shaft 10 are the opposed bevel gears 11 and 12 and keyed to the shaft between the bevel gears 11 and 12 is a sleeve 13 having clutch faces 14 and 15 at opposite ends thereof with still threads 16 upon the exterior of the sleeve.

Due to the fact that the bevel gears 11 and 12 are rotating in opposite directions, it will be noted that when the sleeve 13 is connected to the bevel gear 12, the shaft 10 will be rotated in a forward driving direction and when the sleeve is engaged with the bevel gear 11, the shaft will be driven in a reverse direction.

The shaft 10 is suitably mounted in bearings 17 and 17' and the bevel gears 11 and 12 are arranged in their proper relative positions by having one of the gears engaging the bearing 17 and the other gear 11 abutting against a fixed collar 18 on the shaft which is arranged in position by means of a set screw 18.

Loosely mounted upon the shaft 10 and spaced from the gear 11 is a comparatively large sprocket wheel 19, the hub 20 of which abuts against the fixed collar 21 on shaft 10 which is retained against movement by means of a set screw 21'.

Arranged in opposed relation with the sprocket 19 and loosely mounted upon the shaft 10 with its hub abutting the bearing 17' is a sprocket 22. Keyed to the shaft 10 and positioned between the two sprockets 19 and 22 is a sleeve 23 having an annular rib 24.

The ends of the sleeve 23 are formed with clutch faces 25 and 26, the clutch face 25 being adapted to cooperate with a similar face on the hub 20 on the sprocket 19 for driving the sprocket with the shaft 10 and the hub of the sprocket 22 is provided with a clutch face adapted to cooperate with clutch face 26 on the sleeve 23 for driving this sprocket. From the foregoing, it will be apparent that the two sprockets 19 and 22, may be easily driven either in a forward or a reversed direction in accordance with the relative positions of the sleeves 13 and 23.

Mounted upon one end of the shaft 10 and keyed thereto are two adjacent sprockets 27 and 28, the sprocket 27 being somewhat smaller in diameter than the sprocket 28 and used for driving the tractor at a comparatively low rate of speed when the digging mechanism is in operation. The sprocket 28 can also be used for driving the tractor at a different rate of speed.

Supported upon the frame rearwardly of the shaft 10 is a gear housing 29 which is preferably liquid tight as it is necessary to have this housing filled to a predetermined depth with lubricating oil and extending transversely through this housing 29 are the superposed shafts 30 and 31, the shaft 30 being arranged beneath the shaft 31. The shaft 31 projects beyond the housing 29 at one side of the machine, as shown in Figures 7 and 11 and has mounted thereon two adjacent sprockets 32 and 33, the sprocket 32 being somewhat larger than the sprocket 33 for low driving speed.

These sprockets 32 and 33 may be connected up to the sprockets 27 and 28 by means of a sprocket chain 34. As shown in Figure 11, the sprockets 27 and 32 are connected by the chain 34 for comparatively low driving speed, but, however, should it be desired to increase the speed of driving, the chain 34 can be readily shifted to engage sprockets 28 and 33. The shaft 31 is mounted in the sides of the housing in suitable bearings 35 and 35' and loosely mounted upon the shaft 31 adjacent the bearing 35' is a gear 36, and mounted upon the shaft adjacent bearing 35 is a sleeve 37 rotated independently of shaft 31 and carrying a pinion 38 at one end and the clutch member 39 at the other end.

The two gears or pinions 36 and 38 are adapted to mesh with comparatively large gears 40 and 40' upon shaft 30. It will be noted that the diameter of pinion 36 is somewhat smaller than pinion 38 so as to drive shaft 30 at a comparatively low rate of speed, while the increased diameter of pinion 38 will drive shaft 30 at a higher rate of speed, and the relative width of pinions 36 and 38 vary to the extent that the pinion 36 is somewhat wider than pinion 38 and is adapted to be engaged by the clutch member 41 at one end of sleeve 42.

Sleeve 42 is keyed to shaft 31 and slides longitudinally of this shaft. The end of the sleeve 42 opposite the clutch member 41 is formed with a second clutch member 41' which is adapted to co-operate with clutch member 39 for driving shaft 30 at a slightly higher rate of speed than the connection with pinion 36. The sleeve 42 is provided with a plurality of still threads 43 adapted to be engaged by means of a toothed sector 44 mounted upon a vertical shaft 45. This shaft 45 has at its upper end an arm 46 connected to the lower end of a hand lever 47 rockably mounted on a bearing shaft 48. The shaft 48 has its ends rotatably mounted in suitable bearings 49 arranged upon the cover plate 50 which extends over the top of the frame, as shown in Figure 1. Loosely mounted upon the shaft 30 are the beveled pinions 51 and 52, each pinion having a clutch face 53 adapted to be engaged by the clutch faces 54 on the ends of sleeve 55. Sleeve 55 is keyed to shaft 30 for longitudinal movement and has still threads 56 adapted to be engaged by a toothed sector 57 on a vertical shaft 58. The upper end of shaft 58 has an arm 59 which is connected by means of a link 60 to the lower end of hand lever 61 rockably mounted upon shaft 48, whereby through the rocking movement of lever 61, shaft 58 will be rotated to impart a lateral movement to 57 so as to move the clutch faces 54 on sleeve 55 into engagement with either one of the clutch faces 53.

Shaft 30 is rotatably mounted in suitable bearings 62 carried by the side walls of the housing 29 and keyed to one end of the shaft 30 is a sprocket 63 connected to sprocket 19 by means of a sprocket chain 64. As shown in Figure 11, the still threads 16 on sleeve 13 are engaged by a toothed sector 65 carried by a vertical shaft 66 carrying an arm 67 which is connected to a hand lever 68 by means of a link 69 whereby shaft 66 may be rotated to impart a sliding movement to sleeve 63 for moving either one of the clutch faces 14 and 15 into engagement with either the bevel gear 12 or the bevel gear 11. The toothed sector 70 is engaged with the annular rib 24 on the sleeve 23 and is carried by a vertical shaft 71 which extends upwardly and has attached to its upper end an arm 72 connected by means of a link 73 to a hand lever 74, whereby rocking movement of the lever 74 on shaft 48 will impart a longitudinal movement to sleeve 23 and move either one of the clutch faces 25 or 26 into engagement with the clutch faces carried by the sprockets 19 and 22. Lever 68 is also rockably mounted upon shaft 48 whereby the rocking movement of this lever will rotate shaft 66.

Engaged with bevel pinions 51 and 52 is a bevel gear 75 upon the inner end of a shaft 76. Shaft 76 is mounted in a suitable bearing in a partition 77 in the gear housing 29 and carries at its outer end a pinion 78 which meshes with pinions 79 and 80 on the parallel shafts 81 and 82, thus driving these two shafts simultaneously.

The pinions 79 and 80 are each formed upon a sleeve 83 having still threads 84 and the threads 84 are engaged by the toothed sectors 85 and 86, sector 85 being mounted upon a transverse shaft 87 while sector 86 is mounted upon the inner end of a sleeve 88 rotatably mounted upon shaft 87. Shaft 87 extends outwardly beyond sleeve 88 and carries a hand lever 89, while sleeve 88 also has a hand lever 90 attached to its outer end, whereby through the medium of the hand levers 89 and 90, shaft 87 and sleeve 88 may be rotated independently.

Both sleeves 83 are keyed to the shafts 81 and 82 whereby through the manipulation of levers 89 and 90, both of the pinions 79 and 80 may be engaged with the pinion 78 on shaft 76 or either one of the pinions may be engaged with pinion 78 while the other is disengaged therefrom.

At the rear of the frame of the machine and attached to the U beams, are the bearings 91 for the traction shafts 92. The outer ends of these traction shafts have attached thereto the driving wheels 93, while the inner ends project into a suitable housing 94 and are supported within bearings 95 carried by the top sections 96 of the housing. The two top sections 96 are in separate pieces and are adapted to house the worm gears 97 on the two shafts 92. Engaged with the worm gears are worms 98 carried by the two shaft sections 99 and 99' which in turn are operatively connected by means of the flexible connection 100 to the shafts 81 and 82, whereby the worms 98 will be driven to rotate the traction shafts 92 and impart movement to the wheels 93.

It will be noted that the inner ends of the shafts 92 extend through the hub sleeves of the worm gears 97 with their inner ends arranged in opposed relation and secured against movement relative thereto by means of the pins 101.

At the rear of the main frame, I provide a supplementary frame 102 which is mounted upon the main frame and supports a transverse shaft 103 around which the bucket chain 104 passes through the medium of a guide wheel 105. The bucket chain 104 passes around a similar wheel 106 at the outer end of an adjustable support 107. This support 107 is adjustable by means of the adjusting members 108 in order to tighten or loosen the chain 104.

The digging and conveying chain 104 includes a plurality of receptacle members 109 carried by the chain and arranged beneath the digging shoes 110 which are pivotally mounted upon the transverse pins 111 which support the receptacles 109. The digging shoes 110 are limited in their swinging movement in one direction so that when they reach their dumping position, as shown in Figure 6, the material carried upwardly by the shoes and receptacles will be deposited upon a transverse belt conveyor 112. This conveyor belt 112 passes around pulleys 113 and 114, pulley 114 being supported by suitable brackets 115 at the outer end of the suspended support 116.

Pulley or drum 113 is mounted upon a longitudinal shaft 117 supported by bearings 118 and carries a clutch 119 adapted to cooperate with a clutch on sleeve 120 which carries a plurality of still threads. These still threads are engaged by a tooth sector 121 on a transverse shaft 122. Shaft 122 carries at its opposite end a hand lever 123 whereby to engage and disengage the clutch faces on members 119 and 120 for imparting rotative movement to drum 113 to drive the conveyor belt 112.

On the forward end of shaft 117 is a sprocket 124 connected by means of a sprocket chain 125, to a sprocket 126 on shaft 8 whereby shaft 117 is continuously driven while the motor is in operation and can be operatively connected to the conveyor belt 112 through the manipulation of hand lever 123.

Mounted upon the shaft 103 are the side bars 127 connected at their forward ends by means of a transverse shaft 128, shaft 128 having connected thereto a plunger 129 which reciprocates within a hydraulic cylinder 130.

In operating the plunger 129 in the hydraulic cylinder 130, I provide a four-way valve 131 and the four outlets to this valve are connected as follows: Outlet 132 is connected by means of a conduit 133 to the upper end of cylinder 130, while outlet 134 is connected by means of conduit 135 to the lower end of cylinder 130. Outlet 136 is connected by means of a conduit 137 to the pipe 138 which leads into the housing 29, while outlet 139 is connected by means of a conduit 140 to pipe 141 which leads to one end of the cylinder 142.

The cylinder 142 is connected to the pump cylinder 143 in which is operated a rotatable pumping element connected to shaft 144. The outer end of shaft 144 carries a sprocket 145 connected by means of sprocket chain 146 to a sprocket 147 on shaft 117 so that the pump 143 may be operated during the rotation of shaft 117.

Connected to the end of cylinder 142 opposite the outlet pipe 141 is an inlet pipe 148 which connects with the conduit 149 leading into the bottom of the housing 29, whereby through the medium of pump 143, the lubricant from housing 29 may be drawn upwardly into the cylinder 142 and forced out through the pipe 141. During the time that the four-way valve 131 is closed, lubricant pumped up into the pipe 141 will be conveyed through conduit 150, through a relief valve 151 and thence through the connection 138 back to the housing 29 so that the lubricant within the housing 29, during the operation of the pump, is being circulated through the cylinder 142. However, when it is desired to operate the plunger 129 in cylinder 130, the relief valve 151 is closed and the four-way valve 131 is opened. This four-way valve is operated by means of a hand lever 152 so that when it is desired to raise the plunger 129, the valve is so positioned as to form a direct communication therethrough between conduits 140 and 135, and also establishing communication between conduits 133 and 137, this arrangement causing the lubricant to be pumped up through pipe 149, through cylinder 142, through pipe 141, through pipe 140, thence through the valve and down through conduit 135 to the bottom of cylinder 130.

As the lubricant is being pumped into the lower end of cylinder 130 there will be a discharge of lubricant at the top of the cylinder and this discharged lubricant will be carried off through conduit 133, thence through the valve and through conduit 137 to pipe 138 and back into the housing 29.

It will be noted that when it is desired to move the plunger 129 down into cylinder 130 the valve plug is turned so as to connect conduits 133 and 140 together, and conduits 135 and 137 together, then the lubricant is pumped into the cylinder through conduits 140 and 133 and conduit 135 will carry off the surplus oil through 137. From this, it will be apparent that the four-way valve 131 is so arranged that conduits 133 or 135 may be connected independently to conduit 137 or conduit 140. It will be apparent from the foregoing that the plunger 129 can be moved in either direction in cylinder 130 for raising and lowering the digging elements, the digging device being illustrated in a raised position in Figure 1, with the plunger 129 moved into the cylinder 130.

Arranged at the forward end of the frame are the traction guide wheels 153, one of said wheels being arranged upon each side of the frame. Extending transversely of the main frame is a non-rotatable supporting shaft 154 which, in connection with the shafts 92 support the longitudinal guide bar 155 and arranged upon opposite sides of the guide bar 155 are the other supporting wheels 156 for the caterpillar chain 157 which passes around wheels 93 and 153 for moving the entire machine in either direction.

The wheels 153 are preferably supported by shafts 158 mounted in suitable slots 159 in the forward end of bars 155 and connected to these shafts are the screw members 160 having one end loosely connected to brackets 161 so that the shafts 158 may be moved longitudinally in slots 159, and in turn move the wheels 153 toward or away from wheels 93 in order to tighten or loosen the tread 157.

It will be apparent that in the operation of my improved trenching machine, the traction elements may be driven independent of the digging device, so that when the digging device is not in use, the machine can be readily moved from place to place through its own power and when the digging device is in operation, the entire machine can be moved at a very low rate of speed and the speed changed whenever necessary. It will also be apparent that by means of my improved connection to the wheels 93, the machine can be easily steered and turned about whenever desired. It will also be noted that the digging device can be quickly and readily raised and lowered with respect to the main portion of the machine and the material loosened and carried up by the digging machine can be quickly carried off to one side of the trench or ditch being dug.

When it is desired to move the machine from place to place, the clutch 6 is operated by means of the hand lever 6' in order to impart movement to the shaft 8, the shaft 8 carrying the bevel pinion 9 which meshes with gears 11 and 12, and as both of these gears 11 and 12 are loosely mounted on shaft 10, it will be necessary to engage the clutch face 14 with bevel gear 12 for imparting a forward movement to shaft 10 and engaging clutch face 25 with the hub of sprocket 19 to impart a forward movement to this sprocket. The sleeve 13 is actuated by means of hand lever 68, while sleeve 23 carrying clutch face 25 is actuated by lever 74.

The arms 67 and 72 which are connected to levers 68 and 74, respectively, carry locking means in the shape of a transverse sleeve 162 and threaded into one end of the sleeve is an adjustable screw member 163 having a coil spring 164 bearing against the inner end thereof. The coil spring 164 bears against a slidable locking pin 165 which is adapted to fit into an indentation 166 in the cover plate 50 to maintain the levers 68 and 74 in their adjusted position. At this point, it might be well to call attention to the fact that arms 59 and 46 which are connected to levers 61 and 47 respectively, are also provided with similar locking means adapted to engage in corresponding indentations to retain these levers in operative position.

It will be noted that when the clutch face 25 is connected to sprocket 19, this imparts a driving movement to shaft 30 and during the time the machine is being driven from place to place, the sleeve 42 can be in neutral position on shaft 31 as pinions 36 and 38 will rotate loosely on shaft 31 and thus leave this shaft idle during the time the machine is being moved from place to place. While the machine is being moved from place to place, it will be noted that the steering operation can be easily carried out and the connection to the driving wheels 93 is provided for by shifting lever 61 so that sleeve 55 will be moved toward bevel gear 52 whereby clutch faces 53 and 54 will be in contact, thus imparting a forward movement to bevel gear 75 rotating shaft 76 which, through the medium of gear pinion 78 will rotate pinions 79 and 80 on shafts 81 and 82. It will be noted that when the machine is driving straight ahead, both of the levers 89 and 90 are in a forward position, as shown in Figure 1, positioning tooth sectors 85 and 86 so that both pinions 79 and 80 are engaging the pinion 78. This position will rotate worms 98 and impart a simultaneous rotative movement to worm gears 97 for rotating shafts 92.

Should it be found desirable to turn the machine either to the right or left, either one of the levers 89 or 90 can be actuated to disengage one of the gear pinions 79 or 80 from gear pinion 78, thus leaving only one gear pinion cooperating with gear pinion 78 which will leave an operative connection to only one of the shafts 92, leaving the one remaining idle, whereby the machine will turn with the idle wheel 93 as a pivot. It will be noted that by means of the flexible couplings 100, the parts in the housing 94 and 29 can be assembled separately and then the shafts 99 and 99' can be connected up to the shafts 81 and 82 through the medium of these flexible couplings.

When the machine is set for operation and it is desired to move the traction at a low rate of speed during the operation of the digging device, the sleeve 23 is shifted by means of lever 74 until clutch face 26 is engaged with the clutch face on sprocket 22 and this sprocket 22 is connected by means of sprocket chain 167 to a sprocket 168 on shaft 103 for imparting movement to the bucket chain 104. It will be noted that when clutch face 14 engages with bevel gear 12, shaft 10 is always driven in a forward direction which will not only drive the tractor machine in a forward direction but will also drive the bucket chain in a forward direction for digging purposes.

However, when it is desired to reverse the traction movement or reverse the movement of the bucket chain in case any of the buckets become engaged with an object during the digging operation, the sleeve 13 can be quickly moved on the shaft 10 to engage clutch face 15 with bevel gear 11, thus rotating shaft 10 in a reverse movement and reversing the movement of the traction as well as the movement of the bucket chain.

During the time the digging device is in operation, it is necessary that the traction belts 157 be rotated at a slow rate of speed so as to move the entire machine forwardly at a rate of speed which will correspond with the digging operation, and it will be noted that during the digging operation, clutch face 14 is in engagement with bevel gear 12 and through the medium of sprockets 27 and 32 and chain 34, shaft 31 is driven at a low rate of speed, and in order to connect up shaft 31 with shaft 30 for driving the traction, sleeve 42 can be moved on shaft 31 to engage the clutch members 41 and 41' with either the pinion 36 or clutch member 39 in accordance with the traction speed desired. When the clutch member 41 is engaged with pinion 36, the shaft 30 will be driven at a relatively low rate of speed. However, should the digging operation require that the machine be moved at a somewhat higher rate of speed, clutch member 41' can be engaged with clutch member 39, thus driving shaft 30 at a slightly higher rate of speed.

The rate of speed at which the machine is moved during the digging operation will depend upon the digging device and the type of soil through which the buckets are being passed. If the soil is rather hard, the lower rate of speed will be required, but if the soil is soft and easily removed from the trench, a higher rate of speed will be required.

As the bucket chain 104 is moved forwardly the digging shoes 110 will contact with the earth and their cooperation with the receptacle portions 109 carry the material upwardly until the digging shoes begin to turn around the guide wheel 105 at which point they will deposit the material on the transverse conveyor 112 where it will be conveyed off to the side of the trench being dug. In case any loose dirt is dropped downwardly from the buckets while being moved upwardly, it will drop in the inclined trough 169 and carry back in the path of the buckets. This trough 169 is suspended at its forward end by means of suitable chains 170 which are connected to the forward ends of the side bars 127.

During the time the machine is being moved from place to place, it will be noted that the bucket chain 104 and the supporting means has its outer end in a raised position so that this end will not contact with the surface over which it is being moved.

As stated heretofore, the supporting member for the bucket chain 104 is pivotally mounted upon shaft 103 and connected by means of shaft 128 to the plunger 129 which operates in the hydraulic cylinder 130 and the operator by manipulating hand lever 152 can control movement of the fluid under pump pressure into either end of the cylinder for raising or lowering the bucket chain.

It is believed from the foregoing that I have provided a trenching machine whereby trenches for pipe lines and the like, can be quickly dug at a very low cost with considerable labor saving and when the device is not in use can be easily moved from place to place. At this period, I wish to call attention to the fact that while the machine is in digging operation and shaft 30 is being rotated, the sprocket 19 which is connected by chain 64 to sprockets 63 will be idling on shaft 10 as sleeve 23 has been moved to impart movement to sprocket 22.

Figure 14:
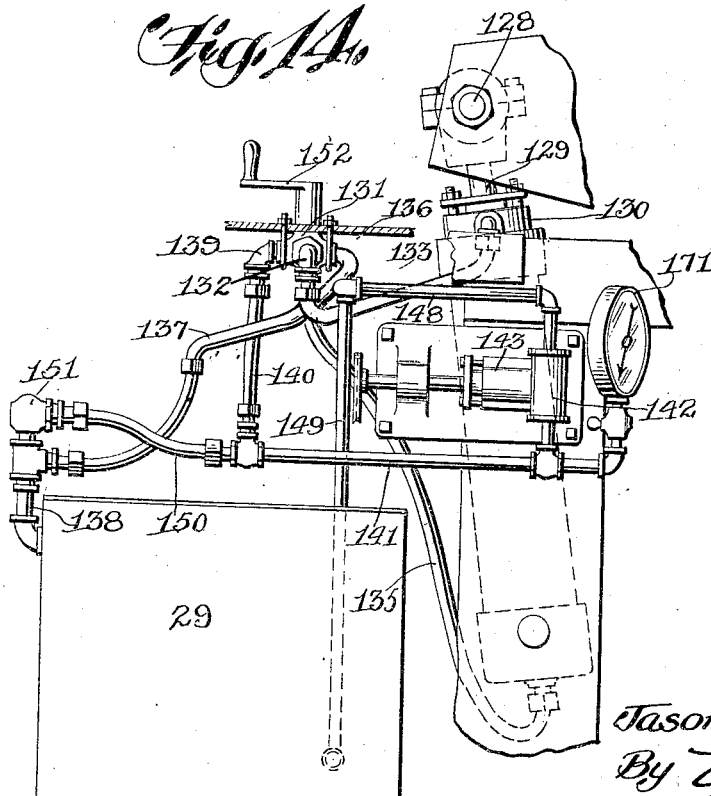
Figure 14 is a detail elevation of the hydraulic lift.
Figure 15:
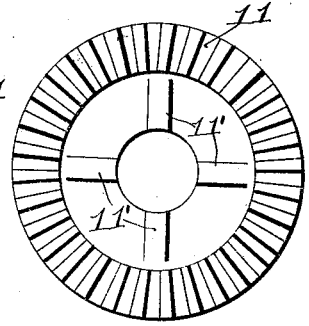
Figure 15 is a face elevation of one of the driving bevel gears.

The bevel gears 11 and 12, as will be noted, in Figures 14 and 15 have their clutch faces comprising the spaced ribs 11' and 12' which are adapted to be engaged by the clutch faces 14 and 15 for imparting either a forward or reverse movement to shaft 10.

Attention is also directed to the fact that attached to the outlet pipe 141 of the cylinder 142 is a gauge 171 whereby the pressure of the pump 143 may be readily ascertained. While the use of this gauge is not essential, it is rather desirable to have it attached to the cylinder 142 in order to correctly determine the pressure necessary to raise and lower the digging device.

I claim:

1. A machine of the class described including a frame, a motor carried thereby, traction means supporting the frame, a driving shaft having operative connection with the motor, means for driving said shaft in either direction, a bucket chain supported by the frame, means forming operative connection between the driving shaft and the bucket chain, means forming operative connection between the driving shaft and the traction means, and means for varying the speed of the bucket chain and the traction means.

2. A machine of the class described including a frame, a motor carried thereby, traction means supporting the frame, a driving shaft having operative connection with the motor, means for driving said shaft in either direction, a bucket chain supported by the frame, means forming operative connection between the driving shaft and the bucket chain, means forming operative connection between the driving shaft and the traction means, and means whereby to drive the traction means at different rates of speed independently of the bucket chain or simultaneously therewith.

3. A machine of the class described including a frame, a motor carried thereby, traction means supporting the frame, a driving shaft having operative connection with the motor, means for driving said shaft in either direction, a bucket chain supported by the frame, means forming operative connection between the driving shaft and the bucket chain, means forming operative connection between the driving shaft and the traction means, means for driving the bucket chain at different rates of speed, and means for driving the traction means at a rate of speed to correspond to the movement of the bucket chain.

4. A machine of the class described including a frame, a motor carried thereby, traction means supporting said frame, a bucket chain carried by the frame, spaced shafts carried by the frame, means forming operative connection between one of said shafts and the bucket chain, means forming operative connection between both of said shafts and the motor, means forming operative connection between the second one of said spaced shafts and the traction means, means forming operative connection between the two spaced shafts and means carried by one of said shafts for controlling the movement of the traction means and varying the speed thereof.

5. A machine of the class described including a frame, a motor carried thereby, traction means for supporting said frame, a pivoted support carried by the frame, a bucket chain carried by the support, a driving shaft having operative connection with the motor, means forming operative connection between the driving shaft and bucket chain, manually controlled means whereby to impart movement to the shaft in either direction, and means forming operative connection between the driving shaft and the traction means for driving the traction means at different rates of speed.

6. A machine of the class described including a frame, a motor carried thereby, traction means for supporting said frame, a pivoted support carried by the frame, a bucket chain carried by the support, a driving shaft having operative connection with the motor, means forming operative connection between the driving shaft and bucket chain, manually controlled means whereby to impart movement to the shaft in either direction, means forming operative connection between the driving shaft and the traction means for driving the traction means at different rates of speed, and manually controlled means for shifting the latter means to change the speed of the traction means.

7. A trenching machine comprising a main frame, traction devices carried by the sides of the frame, an elevated support on the frame, a supporting shaft on the elevated support extending transversely thereof, a bucket chain support including side bars rockably mounted on the shaft intermediate their ends, the forward ends of the side bars extending over the main frame, and manually controlled hydraulic means for swinging the bucket chain support including a transversely extending shaft arranged across the bucket chain support and having its ends connected to the forward ends of the side bars, a cylinder and a plunger rod extending from the cylinder, means rockably connecting one end of the cylinder to the frame, means pivotally connecting the plunger rod to the transversely extending shaft, and means for controlling the flow of fluid into and out of the opposite ends of the cylinder.

In testimony that I claim the foregoing I have hereunto set my hand at Milwaukee, in the county of Milwaukee and State of Wisconsin.

JASON H. MACDONALD.